United States Patent Office 3,245,402
Patented Apr. 12, 1966

3,245,402
PROCESS OF DIAGNOSIS BY INFRARED
THERMOGRAPHY
Robert Bowling Barnes, Stamford, Conn., assignor to Barnes Engineering Company, Stamford, Conn., a corporation of Delaware
No Drawing. Filed May 21, 1963, Ser. No. 281,984
6 Claims. (Cl. 128—2)

This invention relates to a new process of diagnosis by infrared thermography.

Infrared thermographs which are capable of producing thermograms by scanning an infrared detector over a scene to be reproduced are well known instruments. The most commonly used thermograph is of the type described and claimed in the U.S. patent to Astheimer and Wormser No. 2,895,049, July 14, 1959. This thermograph scans an infrared detector across a scene to be photographed, transforming the output of the detector into electric current, which, after amplification, actuates a glow tube, the image of which is scanned in synchronism with the infrared scanning, and traces a line on photographic film. The resulting thermogram is in the form of a raster of a number of lines, and looks very much as a somewhat crude television picture with only 160 lines per frame instead of over 500. The present invention is not limited to the use of the Astheimer and Wormser thermograph, as it is a process which is not concerned with the particular infrared thermograph used.

All infrared thermographs require two controls; one determines the range from hottest to coldest recorded object, and is expressed usually in the form of a range of temperatures or exposures which cover a gray scale on the final thermogram itself. The other necessary control is to fix the average temperature to reproduce as a particular gradation on the gray scale. These two functions must be performed in order to carry out the process of the present invention, and must be capable of individual adjustment. This can well be realized by the fact that the average temperature of the scene may vary greatly. If one is photographing a boiler, the average temperature might be several hundred degrees, or if photographing the human skin, which is done in the process of the present invention, the average will be more nearly 90° F. or slightly lower. The range may be a large number of degrees or a small number of degrees, and one may have a narrow range with a high-average temperature, and a broad range with a low, or vice versa. The two controls will be referred to as contrast and brightness or level controls respectively.

When an ordinary infrared thermogram is taken, the average temperature adjustment is set by the brightness control somewhere in the middle of the temperatures of the objects in the scene, and the range of temperatures then adjusted so that all of the objects of interest will fall within the gray scale on the final print.

The ordinary method of taking an infrared thermogram which has been described above can be seen to be very similar to that which is used in ordinary photography, where a light meter determines the average brightness of the scene, the camera exposes it so that this brightness comes somewhere in the middle of the response of the film, and the range of the objects faithfully reproduced is determined by the nature of the film used.

In the present process it will appear from further description that the ordinary steps of determining the conditions for the infrared thermogram are deliberately not followed, and together with other steps which are necessary, produce a new result. Before describing a typical operation of the process, certain problems and fields of utility will be set out.

One of the currently most important, but by no means the only, use of the process of the present invention is to aid in the diagnosis of cancer, and this modification of the process will first be discussed. Cancerous tissue has been found to have a significantly higher vascularity and metabolism than ordinary tissue. This has been found to result in the skin above the cancer being somewhat hotter than that above the surrounding tissue. When the skin of the patient is maintained in a chosen, predetermined thermal environment, which must be constant during the taking of the picture, an equilibrium will be reached so that the skin over a cancer is slightly hotter than other, and particularly adjacent, portions of the skin, and so when the other necessary process steps are carried out, a thermogram results in which a cancer shows as a light or bright spot on the thermogram of the skin of the region of the patient's body in question. The necessary thermograph adjustments are quite different than for an ordinary infrared thermogram, but before describing how they differ and how they are made to perform the present process, a few considerations of the resulting diagnostic photograph will make the achievements of the process of the present invention more clearly understandable.

The process of the present invention has been tried on scores of patients, and the interpretations of the films checked either by surgery, where this seemed indicated, or by other known diagnostic methods. A negative correlation with malignancy has been found uniformly. Within the capabilities of the process, so far there have been shown substantially 100% negative correlation. The term "negative correlation" requires some explanation. If the thermogram does not show any hot spots on the skin, in other words, if the diagnositic process has indicated that there is no cancer, this has been borne out uniformly. Positive correlation, that is to say, the appearance of hot spots, is not so complete, because the process produces an indication of higher temperature in localized skin areas regardless of what caused this higher temperature. Cases have been encountered where a foreign body lodged in tissue, bruising, or other causes, have produced a local inflammation in the tissues. This, of course, reports on the thermogram as a light or white spot, and it cannot be determined by observing the thermogram alone what caused the white spot. However, when checked by other diagnostic methods, it is ordinarily possible to determine that the unusual cases which produce an indication by the present process that is similar to cancer, are actually caused by something else.

The great importance of the present invention is that it gives another diagnostic tool to the skilled physician which has a high negative correlation, that is, a correlation with the absence of malignancy. It lends itself readily to screening procedures, because the taking of an infrared thermogram which, even with the relatively slow machines available today, is only a matter of about five minutes, is painless, requires no irradiation of the patient, and presents no discomfort. Therefore, there is less likelihood of patients failing to come for a check-up and thus cancers developing to the point where they are no longer curable. The present process is only one diagnostic tool, but it is a very important one because it can be used so safely, so easily, and so painlessly.

It should be realized that there are theoretical limits to the present invention. The cancer must be large enough and near enough to the surface so that the skin temperature is actually raised. This theoretical limit to the operation of the present invention is, however, not a serious limit in practice. Even deep-seated cancers, for example in the pelvic bone, if they have proceeded to the point where they are serious, register. This will be described in connection with one of the examples in the specific description of the present invention.

The fact that the present invention, in common with other diagnostic procedures, cannot determine the exact instant when the first cancer cell forms, is also not a serious drawback. Very tiny cancers, which have just started, present normally but little danger, and the present invention shows the possibility of the presence of almost any cancer which has proceeded to the point where immediate medical action would be indicated. The present invention, therefore, adds a very valuable new diagnostic tool, but does not make it possible for a skilled physician to throw away his other tools. In common with any diagnostic procedure, the skilled doctor must use it in conjunction with such other check methods as the nature of the circumstances indicates. However, the present invention permits easy, quick, and painless checking, and in the case of some non-malignant conditions, may make is possible to avoid unnecessary surgery, or to limit drastically the amount of surgery needed. It therefore constitutes a valuable new tool for the skilled physician.

Considering now the other features of the process, in more detail, it has been found necessary to maintain a constant thermal environment around the skin portion which is being photographed. This may be illustrated with a crude example. Let us assume that a patient had skin cancer on his hand, and that the arm and hand were thermographed but a blast of freezing air was blowing over the hand. This non-uniform thermal environment could cool the skin on the hand so greatly that the cancer would not show up, and in fact, the whole hand would appear almost uniformly cold. It should be noted that what is stated is that a thermal environment is maintained at a predetermined point and a constant one for the duration of the photograph; it does not mean that any particular temperature of environment is chosen or maintained, and in a further and extremely important specific modification of the invention, there will be described procedures in which the skin is first cooled and then allowed to warm up gradually. However, there must not be drastically non-uniform thermal environment around the skin during the actual taking of any particular infrared thermogram.

In addition to the first step of the process, that is to say, the maintenance of a thermal environment around the skin of predetermined temperature and constancy, it is necessary to take the thermogram under conditions which are deliberately different from an ordinary thermogram. Instead of determining the average temperature of the skin, setting the brightness control of the thermograph so that this temperature registers in the center of the gray scale, and then adjusting the contrast control so that all of the portions of the skin photographed will fall within the gray scale, this normal procedure for infrared thermography is departed from drastically. In fact, a picture is taken which is deliberately a very poor picture under ordinary criteria of infrared thermography, and the two steps which follow will be seen to be directly contrary to good infrared thermographic practice.

When a photograph is taken of a portion of patient's skin where there is a suspected cancer, a vascular blockage, or other condition which is to be diagnosed, the thermograph is first preliminarily scanned for a line or two across the portion of the skin to be thermographed, and response on the gray scale noted. On the Astheimer and Wormser instrument this response is indicated by a current meter showing the current going through the glow tube. The brightness control, which is an offset control, operating somewhat analogously to a brightness control on a television receiver, is then set so that this spot is near the white end of the gray scale, but not beyond it. For example, on a typical Astheimer and Wormser thermograph, where the meter reads from 3 ma. to 30 ma. over the gray scale range, the thermograph would not be set for 30 ma. but for slightly less, perhaps 26 ma., 27 ma., or the like. Now the average temperature of the skin may be noted, but it should be noted that the middle of the gray scale is not set at the average, but nearer to the white end of the scale, so that a sharp contrast between the hot spot and tissue which is cooler but not the coldest can be obtained. This will normally require setting the contrast control, which is ordinarily set by varying the amplifier gain in the instrument, so that there will be a narrow range, and high contrast. In other words, the average temperature of the skin is set to record, not in the center of the gray scale as would be normal, but near the hot spot noted, and the range of the exposure to cover the whole of the gray scale is decreased below normal infrared thermographic practice. Both of these operations have to be performed, and neither is in accordance with ordinary thermographic practice.

When the two steps above have been performed, and the thermograph controls thereby set, the thermogram is taken. Under these circumstances, a reliable thermogram is obtained, whereas by the normal methods of thermography, setting the brightness control so that the average skin temperature records in the middle of the gray scale and having the contrast control set sufficiently wide so that all portions of the skin fall within the gray scale, nice looking thermograms are obtained which are either diagnostically valueless, or which will only show extreme conditions. The abnormal process steps for adjusting the thermograph, which are an essential part of the present invention, are necessary for accurate diagnostic results.

In a few cases the spots of interest are of a different type, which will show up as cooler skin. In such cases the procedure is modified by setting the cool spots near the black end of the gray scale.

One other characteristic and advantage of the present process merits brief comment. Some diagnostic tests, which merely show the presence or absence of cancerous cells, but not their precise location, do not aid when radiological treatment is needed, or is considered desirable. In such cases it is necessary to aim the radiation at the precise spot in order to obtain maximum efficiency with minimum damage to the patient. The present invention locates suspicious spots accurately, and shares with certain other diagnostic procedures, such as certain X-ray procedures, the advantage that it gives the physician an accurate information of where the particular cancer is located. While the present process is not the only one that has this advantageous feature, it is an advantage of the present invention that the location is combined with the indications of presence, or rather absence, of malignancy.

The second most important field for the present invention is in vascular stoppages. For example, there may be a clot or blockage in an artery, or a vein block as in phlebitis, and the like. It is necessary to act fast, because often the stoppage in an artery or vein, if it is neglected too long, may result in gangrene or other serious damage. Ordinarily, the diagnosis that some stoppage is present can be made easily, but it is important to locate the stoppage. Otherwise, unnecessarily long surgical incisions may be required, and it is always desirable for the surgeon to know where certain damaged areas are located before he actually proceeds with his surgery. When the present invention is used for the location of vascular stoppages, the same process steps, or very similar steps, are used as in the thermographic diagnosis for suspected cancer. Again, the instrument brightness control is set so that the hottest spot of interest, in this case the blood vessel above the clot, appears as white, but not beyond the gray scale. A suitable contrast control setting is also chosen for the machine which will ordinarily be narrower than with conventional thermograms, but may not necessarily be of exactly the same width as in a thermogram for the detection of cancer.

The present process is not something which is automatically performed by a machine, and is therefore not capable of being practised by completely unskilled people. It is intended to be performed by skilled physicians and their skilled technical helpers, and of course the interpretation of the thermogram is also one for skilled physicians, although in many clear cases, the photograph is so striking that even a layman could notice the difference.

In vascular work, the present invention is also usable to determine how serious the danger of gangrene may be. In this case, the instrument may be set near the dark end of the gray scale for the portion of the skin over tissue where gangrene is feared. Again, the brightness control adjustment will normally not cause average skin temperature to record in the center of the gray scale, but will be sufficiently near the dark end to give the desired degree of contrast.

In the two most important uses described above, for cancer diagnosis and diagnosis of vascular diseases, the invention has utilized an equilibrium skin temperature as far as external environment is concerned. Putting it another way, the indication of the skin temperatures has been the result of the equilibrium between the hotter spot underneath, or colder in the case of a vascular stoppage, and the skin itself, and for this purpose, of course, the skin may be subjected to a uniform environment of almost any suitable temperature, ranging from a warm room to a cool room, the latter, however, being often preferred.

There are, however, situations where it is desirable, and in some cases necessary, to measure not a skin temperature after equilibrium has been reached, but to measure the rate at which a particular portion of the body tissue is supplying heat. Let us take, for example, the situation presented by a blood vessel, for example an artery, which may have become misplaced by accident or other damage, or which may have a stoppage that is not a clot, but has decreased the blood flow. In such cases, ordinarily, an infrared thermogram made by the present invention, as described above, will not show the location of the blood vessel or changes along it with sufficient contrast, because the temperature of the blood vessel may be the same as the surrounding tissue, and in the case of a partial stoppage the temperature below the stoppage may still be approximately the same as the surrounding tissue if there is a fair amount of flow of blood, even though somewhat restricted. The equilibrium method of thermography will not work well in such cases, because if the blood is about the same temperature as the tissue, so will be the skin above it.

An extremely important modification of the present invention permits the diagnosis of changes in such cases by a special procedure. In this procedure the skin is deliberately cooled down, either by contact with cold water, ice, volatile liquids, mentholated jellies, water-soluble jellies which cool by evaporation, or by exposing it to uniform radiation from a cold plate, cold window, or the like. The skin is brought down to a temperature at which practically everything is too cold to record photographically with a known or an approximated setting of the infrared thermograph brightness control. Now the chilling is removed, although it is still necessary to maintain a uniform thermal environment for the skin, and the blood flowing through the blood vessel proceeds to heat up the tissues and hence the skin over them. This is now a function, not only of the temperature of the blood in the blood vessel, but rather the rate at which it is warming up the chilled tissue and skin. Rather dramatic results have been obtainable because, as the skin begins to warm up, first the blood vessels nearest the surface begin to show, and then the deeper ones, also veins are often a little hotter than arteries and show up first. The thermograms are quite striking, but since there are quite a few variables, it is often not possible to determine exactly the moment when the best thermogram will be obtained. It is, therefore, present practice to take more than one thermogram, usually one at a skin temperature too low to show anything worthwhile, and then one or more as the tissues and the skin warm up.

While the most important advantage of the preferred specific modification involving pre-chilling of the skin with gradual warming up is in vascular work, this modification is not so limited. In many cases, clearer thermograms for cancer detection have been obtained by using the pre-chilling and warming up modification, and it is therefore an advantage of the present invention that the diagnostician has several modifications for cancer diagnosis from which he may pick the most suitable for a given patient. It should be noted that the chilling and warming up method can vary the contrast by showing warming up of the skin due to rate of heat supply to the tissues beneath rather than an equilibrium which is reached. In many cases of malignancy the greater heat of the malignant growth includes a more rapid supply of heat and this is why improved diagnostic thermograms for the diagnosis of suspected malignancy may often be obtained by the prechilling and warming up method. Also, for many such purposes, the contrast obtainable when the skin and tissues have reached an equilibrium is not the best. For many purposes, therefore, the prechilling modification is the preferred one.

The invention will be briefly described in connection with the examples which illustrate various uses of the diagnostic process under various conditions.

*Example 1*

This example was a woman suffering from duct cell carcinoma with some metastasis. A thermogram was taken with the thermograph brightness control adjusted so that hot areas on the left breast showed almost white on the gray scale. The right breast, which was normal, thermographed practically black (relatively cold), which is typical of fatty tissue which insulates the skin from the hotter body portions lying underneath. The hot areas on the left breast were at least six gray scale gradations brighter, and hence hotter, than the corresponding areas on the right breast in spite of the fact that the left breast had as much fatty tissue as the right. This shows the importance of the present invention as a diagnostic tool for a skilled physician. He is concerned with the different appearance as compared with a normal breast, and only secondarily with the actual temperatures, since his diagnosis will depend on temperature difference. The thermograph sensitivity was deliberately increased, resulting in an extremely contrasty thermogram, which for ordinary thermography would be considered of very poor quality.

The patient in the case of Example 1 was operated on, and the results of the operation confirmed exactly the indications shown on the thermogram. Infiltrating duct cell carcinoma was found.

*Example 2*

This example was of a woman in her eighties with terminal breast carcinoma, which had metastisized greatly. Two thermograms were taken showing left and right breast respectively, which were matched in so far as the areas of interest are concerned. The temperature difference between breasts was very marked. This was a terminal case; the case was diagnosed as being inoperable, and the patient is now dead. In the thermograms taken the right breast which was normal shows much colder than other portions of the skin, for example the skin on the neck and abdomen. Here again, contrast was sharply increased, which is quite typical of most thermograms by the present invention.

Example 3

This example involved a case of a man with metastatic cancer in the pelvic region. A thermogram was taken with the pelvic region at the top and shows the massive involvement of the pelvic bone between the two black areas represented by the buttocks, which, of course, because of their fat exhibited much cooler skin temperatures. This example illustrates an interesting facet of the present invention. The cancer was so deep that when a thermogram was taken from the front through the great thickness of abdominal tissue, no clear picture was obtainable, but as soon as the patient was turned onto his abdomen, and the thermogram taken through the back, the increased temperature of the skin over the malignancy was immediately apparent. Because of the thick layer of tissue even from the back, it was necessary to make adjustments so that the normal skin on the backs of the thighs appear whiter than would normally be the case if a cancer nearer to the skin surface had been involved. The indications of the thermogram taken were confirmed by other diagnostic means.

Example 4

This example involved a right leg with suspected blockage of the right femoral artery. A thermogram was taken which clearly showed a blockage of the right femoral artery below the knee, the calf having very little blood and hence recording very dark. There being so little blood, the ankle showed practically jet black and therefore cold. The knee itself showed a high temperature because the blood is backed up, and a very careful comparison with the gray scale showed that the knee was somewhat whiter than the thigh above it. In this case, the normal temperature of the skin was more closely approached, and the gray scale was not compressed to quite as great a degree. The extreme compression, and hence extreme contrast, was not necessary because in the case of this example there was a sharp discontinuity of temperature, and this did not require the same degree of contrast as was necessary with the thermograms of the malignant growths, particularly Examples 1 and 2.

In the case of the patient in Example 4, using the thermogram and other diagnostic means, the surgeon decided to perform a saphenous vein bypass, which was done, and about 30 days later a second thermogram was taken. It showed that the operation was a complete success, and there is practically no distinction in the uniformity of circulation in the two legs. As pointed out above, the contrast was not quite so extreme because it was not required, and therefore the second thermogram represents a thermogram of quality which is not as far removed from good thermographic practice as in the case of Examples 1 to 3. The present invention is a tool which must be used with the skill of a physician and infra-red thermograph technician, since the choice is made in accordance with what is considered necessary to give the best showing for diagnostic purposes, even though the resulting thermograms are of very poor quality by ordinary thermographic criteria.

Example 5

In this example four time sequence exposures were taken of an arm with the skin initially chilled to a point where it was uniformly cooled and then allowed to warm up for different times, thus showing the rate at which the chilled skin was warmed up rather than equilibrium temperatures which were used in Examples 1 to 4. The last thermogram of the arm was taken after equilibrium had been reached at room temperature. In the last thermogram there was insufficient contrast to determine conditions underneath the skin with the desired accuracy.

The first thermogram was a thermogram taken after a thoroughly chilled arm had warmed up slightly. In this thermogram only the surface blood vessels at the wrist, the finger tips and the elbow had supplied heat sufficiently rapidly to warm up the skin surface so that it showed on the thermogram. The second thermogram, which was taken a few minutes later, showed considerably more warming up. The hand was warm and some of the skin in the arm over the portions of the tissues which had heated up most rapidly also show as warm areas. For some purposes the second thermogram might be suitable, but for many purposes at third thermogram, which was taken after some further warming up, showed more detail and permitted following the course of some of the blood vessels.

It will be noted in Example 5 that the chilled-skin technique offers a considerable choice of different times of warming up so that the best thermogram for a particular diagnostic purpose can be chosen. This adds great flexibility and is one of the advantages of the chilled-skin technique which permits obtaining thermograms of optimum contrast for particular uses. It should be noted that in the first three thermograms of Example 5 the general principles of the present invention have also been followed, that is to say, the sensitivity of the thermograph has been set so that particular areas of interest are near one or another end of the gray scale.

Example 6

This example represents the chilled-skin technique used to determine whether or not there appeared to be malignancy. The patient was a 61-year-old woman who had had uterine cancer removed more than 10 years ago by hysterectomy, and there had been apparently complete cure. Shortly prior to taking the thermograms, a growth became apparent on the right breastbone. The preliminary diagnosis of the physician was that this was probably not malignant, but should be removed. He suspected that there was a fatty or other tumor which was benign.

The skin across the breastbone of the patient was chilled with cold water, and several thermograms taken. The second, which was best, showed that the area at the right, where the growth was noticeable, is quite black, and therefore cold, indicating the absence of malignancy. This was compared with the area above, where the blood vessels leading to the neck warmed up the skin rapidly. As in most uses of the chilled skin technique several thermograms after different times of warming were taken.

Shortly after the thermograms were taken, the patient was operated on, the growth removed, and checked. It proved to be benign, and thus showed, as many other thermograms have shown, that there is a very high correlation with malignancy in the negative sense. Thermograms which show no hot spots are generally a reliable indication of absence of malignancy.

The examples illustrate numerous typical situations, and show very clearly the technique of the present invention. Thus, in the case of most of the thermograms, the normal procedure for the present process was followed. That is to say, the hottest spots in the suspected region have been made with exposures to nearly the extreme white end of the gray scale. In the case of Example 6, however, the physician's preliminary diagnosis led to an expectation that the suspected area would show up cold, and therefore a position on the gray scale was chosen which would best bring out the points of interest. This illustrates the flexibility of the invention, and is a further illustration that the invention is a tool which in no sense eliminates the need for the professional skill of the physician. It is not by itself an automatic diagnosis.

I claim:
1. A method of thermographic diagnosis of tissues by measurement thermographically of the temperature of the skin overlying the tissues in contrast to the temperature of skin overlying other tissues, which comprises,
    (a) setting the brightness control of the thermograph so that the temperature of the skin in the area of interest is near one of the two ends of the thermo- graph gray scale and not in the center thereof, said one end being chosen to supply optimum contrast between normal tissue and tissue suspected in the diagnosis, (b) setting the contrast control of the thermograph so that a narrow range of temperatures of the skin over both tissues of interest registers within the full extent of the gray scale, and (c) taking a thermogram of the patient's skin in a temperature environment of predetermined uniformity and constancy.

2. A method according to claim 1 in which the hottest spots of the areas in interest are set by the brightness control to be recorded near the white end of the thermograph gray scale.

3. A method of locating vascular blocks according to claim 2 in which the thermograph controls are set so that the temperature of the portion of the skin before the suspected blocked area is recorded near the white end of the thermograph gray scale.

4. A method according to claim 1 in which the skin is chilled to a temperature low enough so that radiations from the skin register below the lowest gradation of the gray scale at the particular thermograph brightness setting and permitted gradually to warm up until a further thermogram shows satisfactory contrast.

5. A method according to claim 4 in which the skin is chilled by direct heat exchange with a cold material.

6. A method according to claim 4 in which the skin is chilled by radiation to a colder surface.

References Cited by the Examiner

UNITED STATES PATENTS

| | | | |
|---|---|---|---|
| 2,728,337 | 12/1955 | Guillemin | 128—2 |
| 2,776,377 | 1/1957 | Anger | 250—71 |
| 2,804,069 | 8/1957 | Schwamm | 128—2 |
| 2,832,333 | 4/1958 | Ferdon | 128—2 |
| 2,888,918 | 6/1959 | Pierce | 128—2 |
| 2,895,049 | 7/1959 | Astheimer | 250—65 |

OTHER REFERENCES

Canadian M. A. J., pages 309–310, August 15, 1956.

Canadian Serv. Med. Journal, pages 517–524, September 1957.

Canadian M. A. J., pages 1129–1131, May 20, 1961.

The Lancet, pages 1378–1381, Dec. 23, 1961.

RICHARD A. GAUDET, *Primary Examiner.*

LOUIS R. PRINCE, SIMON BRODER, *Examiners.*